(12) United States Patent
Wu

(10) Patent No.: US 6,771,496 B1
(45) Date of Patent: Aug. 3, 2004

(54) COMPUTER MODULE ANCHORING STRUCTURE WITHOUT USING SCREWS

(75) Inventor: Wen-Liang Wu, Tainan (TW)

(73) Assignee: Cotytech Industrial Inc., Kun Shan (CN)

( * ) Notice: Subject to any disclaimer, the term of this patent is extended or adjusted under 35 U.S.C. 154(b) by 0 days.

(21) Appl. No.: 10/444,967

(22) Filed: May 27, 2003

(51) Int. Cl.$^7$ ................................................. G06F 1/16
(52) U.S. Cl. ................. 361/685; 312/223.3; 364/708.1; 108/109
(58) Field of Search ........................ 361/685, 683–684, 361/686–687, 724–727; 312/223.1–223.6, 334.4, 330.1; 108/109–110; 364/708.1

(56) References Cited

U.S. PATENT DOCUMENTS 5,896,273 A * 4/1999 Varghese et al. ............ 361/724
6,227,631 B1 * 5/2001 Lin et al. .................. 312/223.2
2003/0235032 A1 * 12/2003 Lee ............................ 361/685

* cited by examiner

Primary Examiner—Hung Van Duong
(74) Attorney, Agent, or Firm—Birch, Stewart, Kolasch & Birch, LLP

(57) ABSTRACT

An anchoring structure for computer modules without using screws includes a computer cartridge which has cartridge walls on the left side and the right side to house therebetween a plurality of modules in a longitudinal manner. Each cartridge wall is spaced from a cartridge side wall to form an actuating compartment. An actuating plank is located on an outer side of the cartridge wall and coupled on struts. Each strut is coupled with an elastic element to press the actuating plank inwards. The actuating plank has an inner side formed latch elements to engage with cavities formed on the modules. A pulling plank is provided that has one end extended outside the cartridge and jutting tongues located inside corresponding to bent eaves of the actuating plank. The modules may be anchored or removed by pulling or pushing the pulling plank.

5 Claims, 6 Drawing Sheets

COMPUTER MODULE ANCHORING STRUCTURE WITHOUT USING SCREWS

FIELD OF THE INVENTION

The present invention relates to an anchoring module structure for computer cartridges and particularly to an anchoring structure for computer modules without using screws to facilitate fast assembly and disassembly.

BACKGROUND OF THE INVENTION

In general, the installation rack of computers contains various boxes to house a plurality of modules such as floppy disk and hard disk drives, or optical disk drives. The floppy disk and hard disk drives are fastened to the interior of the boxes by means of screws for anchoring on the installation rack. For fastening each floppy disk or hard disk drives to the installation rack, at least four screws are needed. Each screw is turned and driven by a screw driver for tightening or loosening. This operation is repeated for each screw. Thus to assemble and disassemble the floppy and hard disk driver is a time-consuming task.

SUMMARY OF THE INVENTION

The object of the invention is to provide an anchoring structure for computer modules without using screws. The anchoring structure of the invention includes a computer cartridge for housing a plurality of modules. The cartridge has an actuating compartment located between side walls to house an actuating plank. The actuating plank is run through by transverse struts and movable in the cartridge. Each strut is coupled with an elastic element to press the actuating plank inwards so that latch elements extending from the inner side of the actuating plank may latch on cavities formed on the module. A pulling plank is provided which has one end extended outside the cartridge and jutting tongues formed therein corresponding to bent eaves of the actuating plank to drive the actuating plank to move and retract so that the module may be anchored when the pulling plank is pulled and removed when the pulling plank is pushed to achieve fast assembly and disassembly.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
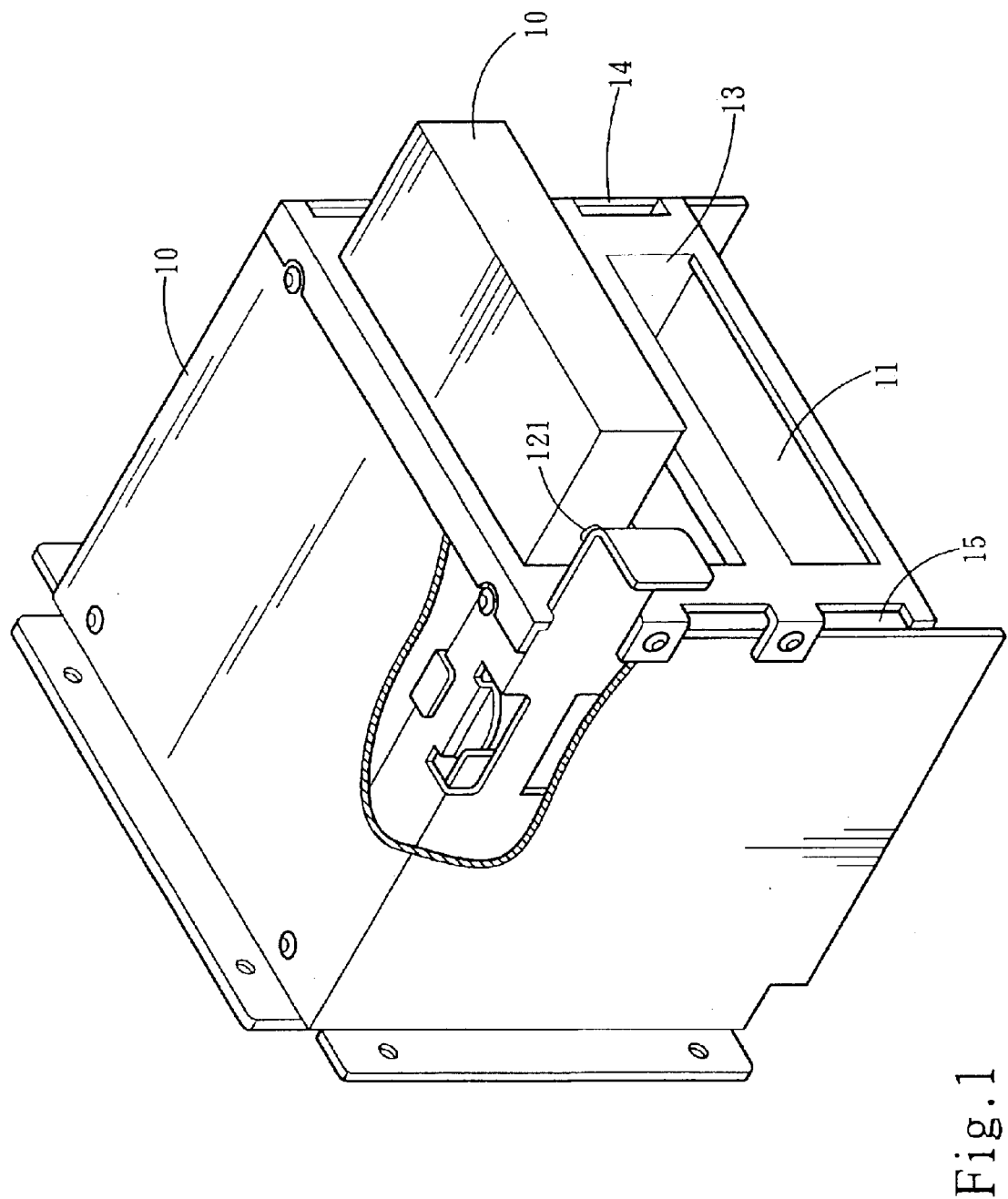
FIG. 1 is a perspective view of a preferred embodiment of the present invention.
Figure 2:
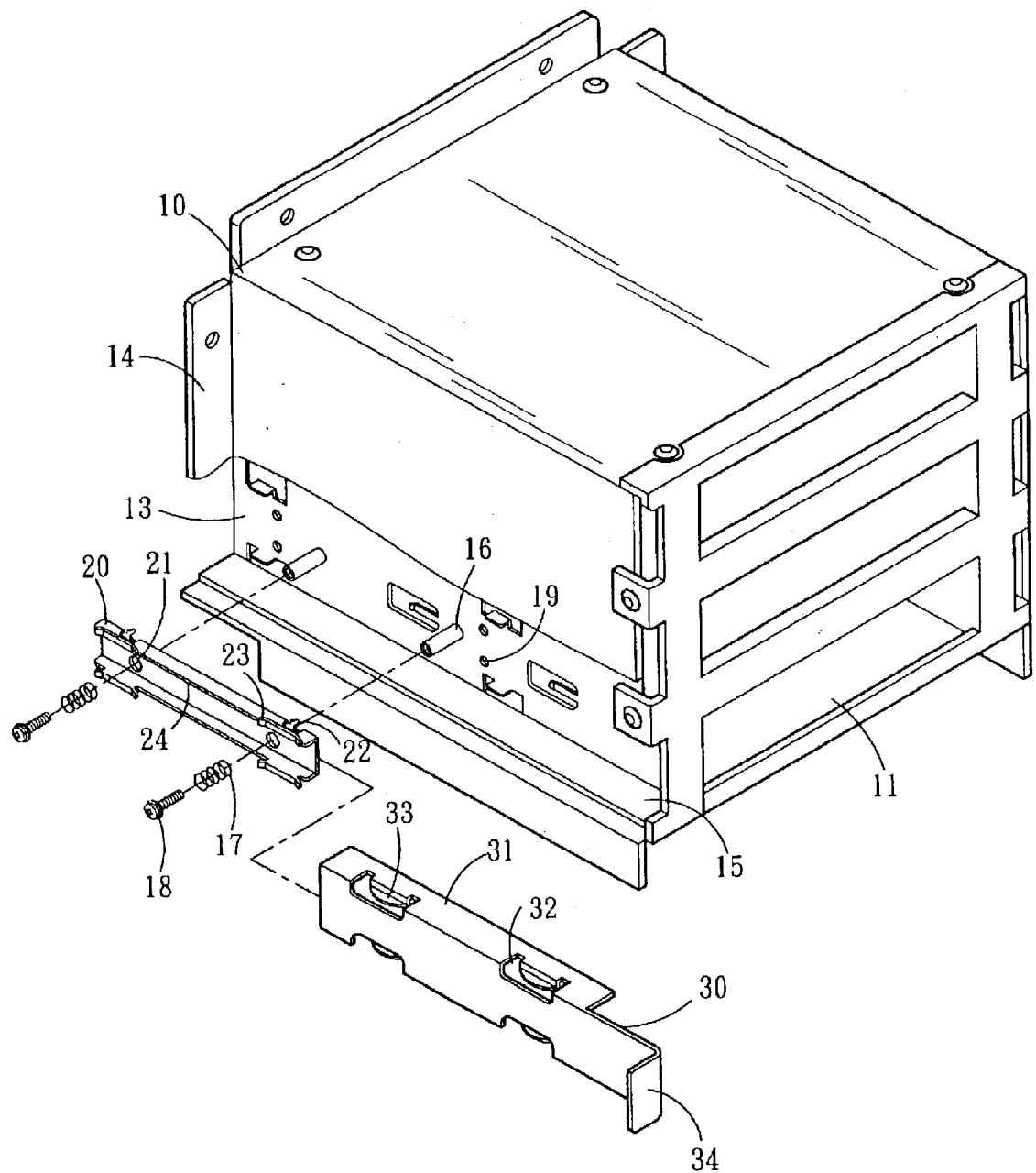
FIG. 2 is an exploded view of a preferred embodiment of the present invention.
Figure 3A:
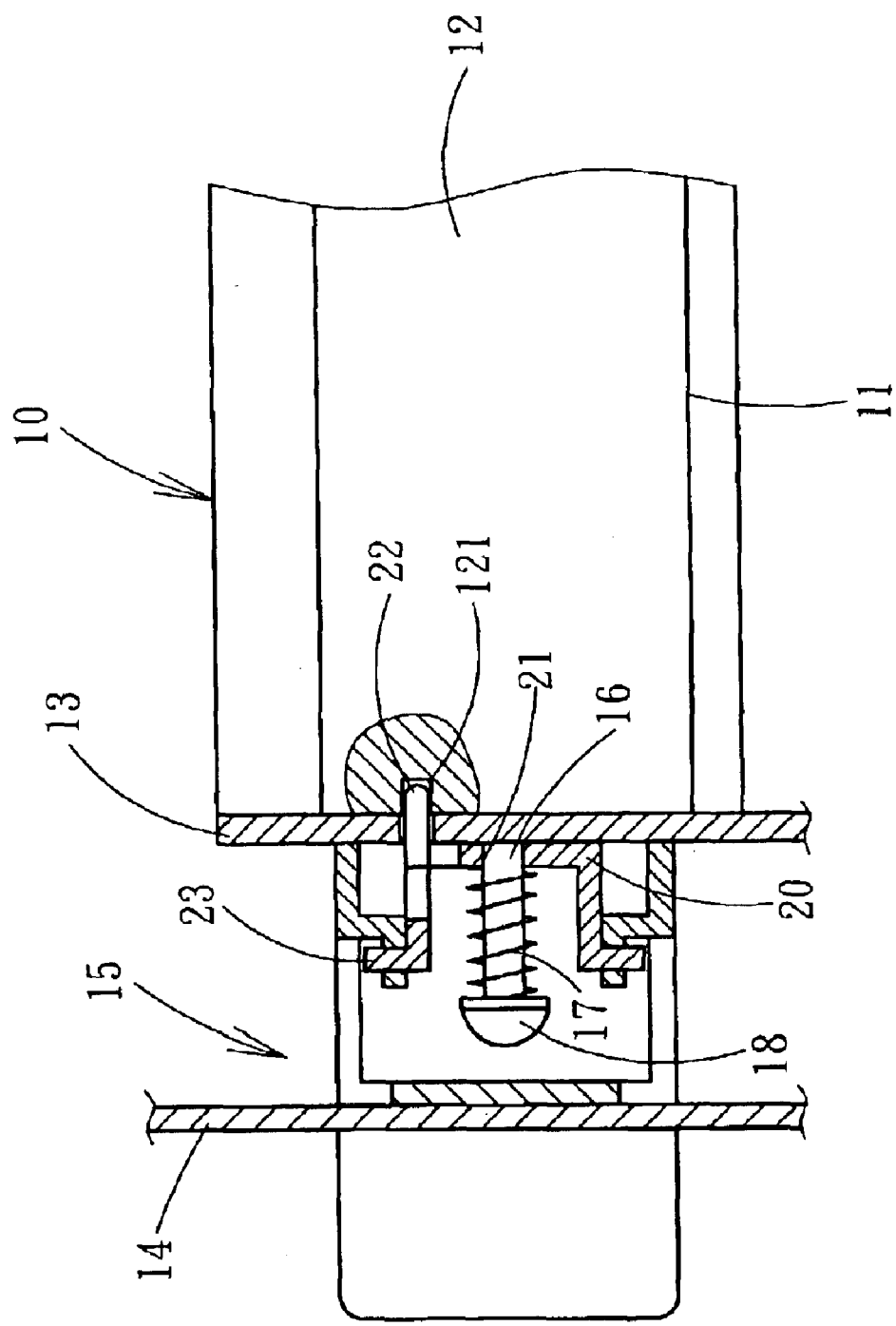
FIG. 3A is a fragmentary sectional view of a preferred embodiment of the present invention in an anchoring condition.

Please referring to FIGS. 1 and 2, the anchoring structure for computer modules without using screws according to the invention includes:

a cartridge 10 which is divided longitudinally into a plurality of housing compartments 11 for housing a plurality of modules such as hard disk 12. Each cartridge 10 has a cartridge wall 13 on the left side and the right side to form an actuation compartment. 15 with a side wall 14. On the cartridge wall 13, there are two transverse struts 16 located thereon in the front side and the rear side, and extended into the actuating compartment 15. Each strut 16 is coupled with an elastic element such as a spring 17 and is fastened by a screw 17 on an outer end thereof so that the screw head 18 is bucking on the outer end of the spring 17 to allow the spring to be firmly held on the strut 16;

an actuating plank 20 formed substantially in U-shape with the opening directing outward and located transversely in the actuating compartment 15. It has two holes 21 formed on the front and the rear side to receive the struts 16 to allow the actuating plank 20 movably located outside the cartridge wall 13. The actuating plank 20 has two latch elements 22 extended from an inner side in the front and the rear sections. The latch elements 22 run through holes 19 formed on the cartridge wall 13 and extend into the housing compartment 11 to engage with cavities 121 formed on the side wall of the hard disk 12. The actuating plank 20 further has respectively two bent eaves 23 projecting upwards and downwards in the front and the rear sections. There is a notch 24 interposed between the two bent eaves 23 of the front and the rear sections; and a pulling plank 30 which is formed substantially in U-shape with the opening directing inwards corresponding to the actuating plank 20. It has a flange 31 formed respectively on an upper side and a lower side to couple with the actuating plank 20 on the upper side and the lower side. Referring to FIG. 3A, the flange 31 has a pair of square windows 32 on the front side and the rear side corresponding to each other in an up and down manner. Each window 32 has an arched jutting tongue 33 extending horizontally outwards and corresponding to the bent eaves 23 of the actuating plank 20 so the bent eaves 23 and the actuating plank 20 may be pushed outwards by the arched tongues 33. The pulling plank 30 further has a pulling lug 34 located at the front end extending outwards to be gripped by a hand for pushing or pulling.

Figure 3B:
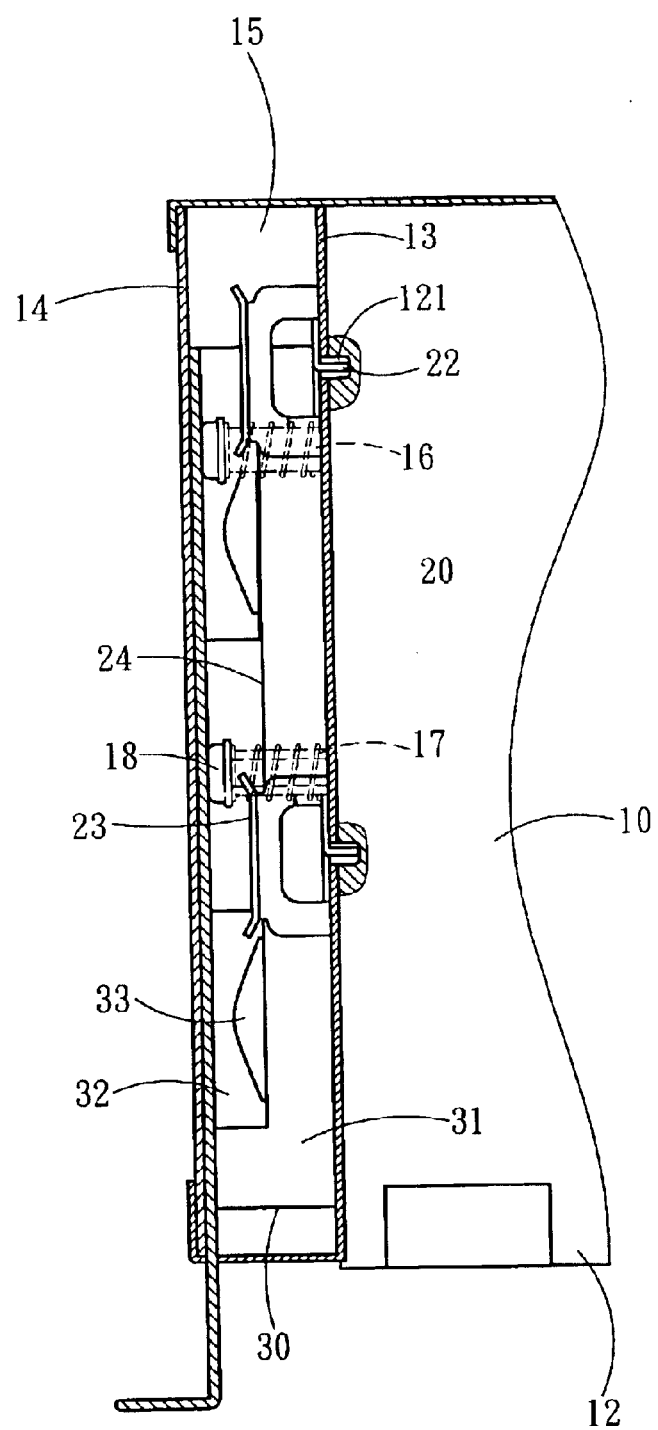
FIG. 3B is a fragmentary schematic top view of a preferred embodiment of the present invention in an anchoring condition.

Referring to FIGS. 3A and 3B, when in use, pull the pulling plank 30 forwards with hand, the jutting tongues 33 at the front and rear sides are moved at the same time and located at the front side of the actuating plank 20. The upper and lower jutting tongues 33 at the front side are moved to the front side of the actuating plank 20, while the upper and lower tongues 33 at the rear side slide to the notch 24 of the actuating plank 20. In other words, the actuating plank 20 is not pressed by the pulling plank 30. The spring 17 on the strut 16 presses the actuating plank 20 towards the cartridge wall 13 to enable the latch elements 22 to wedge into the cavities 121 of the hard disk 12 to anchor the hard disk 12.

Figure 4A:
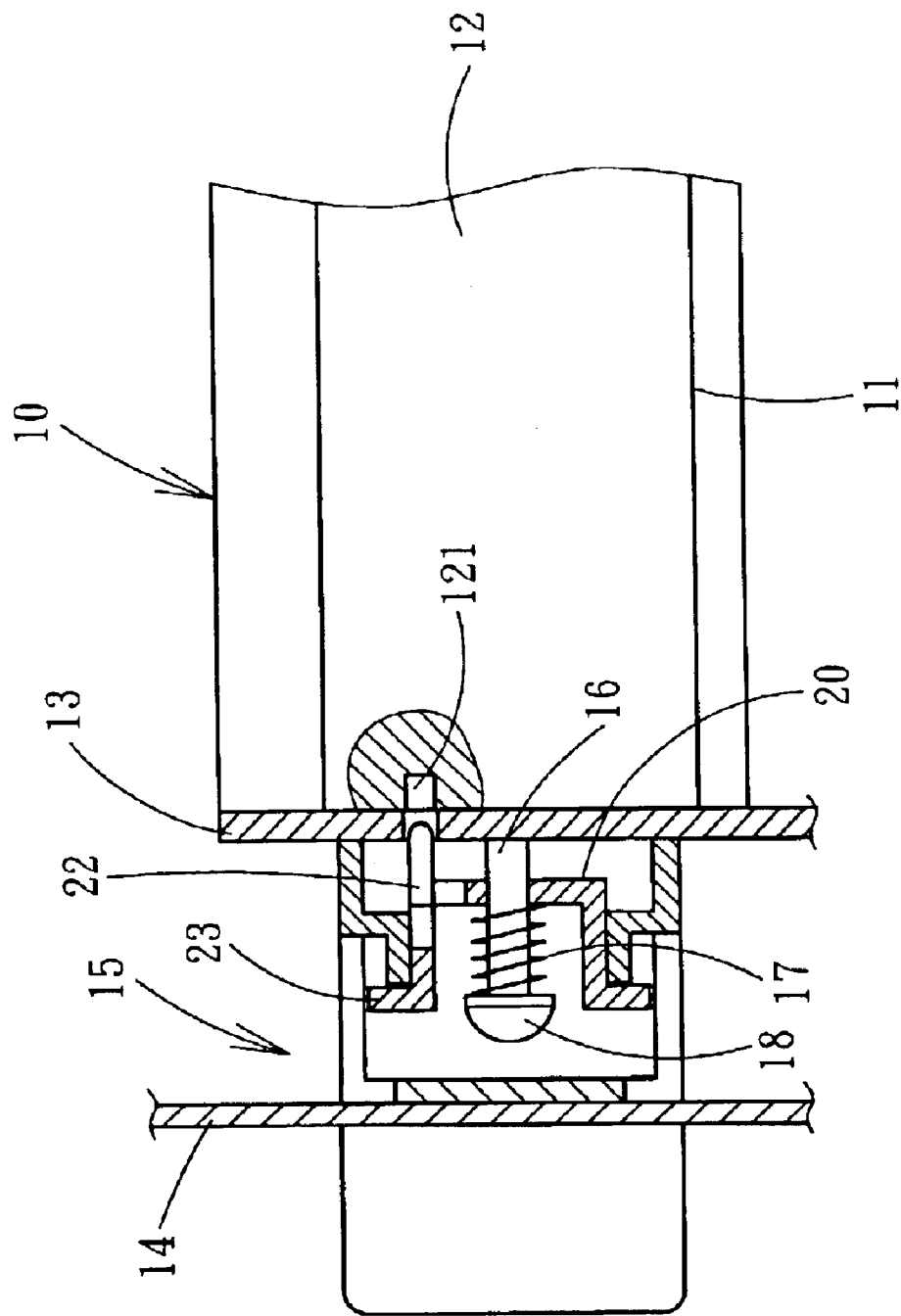
FIG. 4A is a fragmentary sectional view of a preferred embodiment of the present invention in a retrieval condition.
Figure 4B:
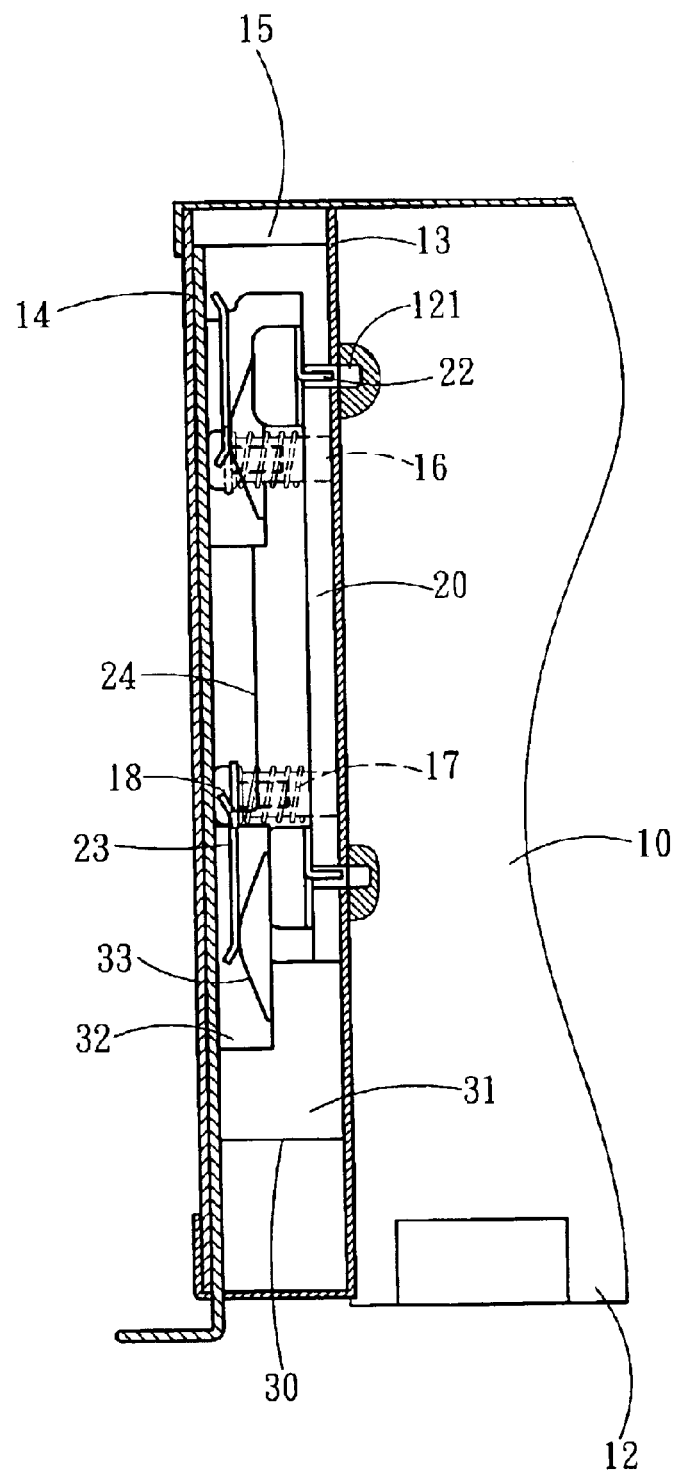
FIG. 4B is a fragmentary schematic top view of a preferred embodiment of the present invention in a retrieval condition.

In contrast, referring to FIGS. 4A and 4B, when there is a desire to pull out the hard disk 12, push the pulling plank 30 rearwards. The upper and lower jutting tongues 33 at the front side press the two bent eaves 23 at the front side of the actuating plank 20, and the upper and lower jutting tongues 33 at the rear side press the two bent eaves 23 at the rear side of the actuating plank 20, therefore the actuating plank 20 is pushed outwards. The latch elements 22 of the actuating plank 20 are moved away from the cavities 121 of the hard disk 12. And the spring 17 is compressed by the actuating plank 20. Once the pulling plank 30 is pulled forwards, the restoring force of the spring 17 pushes the actuating plank 20 inwards to enable the latch elements 22 to extend outside the cartridge wall 13 and move into the housing compartment 11 again to engage with the cavity 121 to anchor the hard disk 12. Thus the invention allows assembly and disassembly to be accomplished without using screws and tools.

What is claimed is:

1. An anchoring structure for computer modules without using screws, comprising:

a computer cartridge which is divided longitudinally into a plurality of housing compartment, each housing compartment having a cartridge wall on a left side and a right side, the cartridge wall having a plurality of holes, the cartridge wall being spaced from a cartridge side wall to form an actuating compartment therebetween, each module having a side wall formed a cavity thereon, the cartridge wall having an outer side which has a plurality of struts mounted thereon;

an actuating plank movably coupled on the struts, each strut being coupled with an elastic element outside the actuating plank, the actuating plank having an inner side which has a selected number of latch elements extended therefrom, the actuating plank further having a plurality of bent eaves projecting upwards and downwards; and a pulling plank having one end extended outside the cartridge and other end formed substantially in U shape outside the actuating plank, the pulling plank having a flange located respectively on an upper side and a lower side thereof, the flange having a horizontal jutting tongue corresponding to an inner side of the bent eave of the actuating plank.

2. The anchoring structure of claim 1, wherein the bent eaves of the actuating plank are formed in pairs and located on an upper side and a lower side corresponding to each other in a front and a rear section thereof, the two bent eaves in the front and the rear section being interposed by a notch, the flange of the pulling plank having a window located respectively on a front and a rear side thereof, the jutting tongue being located in the window.

3. The anchoring structure of claim 1, wherein the strut has an outer end fastened by a screw which has a head bucking an outer end of the elastic element, the elastic element being a spring.

4. The anchoring structure of claim 1, wherein the pulling plank has a front end bent outwards to form a pulling lug.

5. The anchoring structure of claim 1, wherein the modules are hard disks, floppy disks and optical disks.

* * * * *